(12) United States Patent
Wickham

(10) Patent No.: US 10,494,099 B2
(45) Date of Patent: Dec. 3, 2019

(54) AIRCRAFT LIFE VEST STOWAGE POUCH

(71) Applicant: B/E Aerospace, Inc., Winston-Salem, NC (US)

(72) Inventor: Arnold J. Wickham, Winston-Salem, NC (US)

(73) Assignee: B/E Aerospace, Inc., Winston-Salem, NC (US)

(*) Notice: Subject to any disclaimer, the term of this patent is extended or adjusted under 35 U.S.C. 154(b) by 0 days.

(21) Appl. No.: 15/883,708

(22) Filed: Jan. 30, 2018

(65) Prior Publication Data

US 2018/0215470 A1 Aug. 2, 2018

Related U.S. Application Data

(60) Provisional application No. 62/452,421, filed on Jan. 31, 2017.

(51) Int. Cl.
*B64D 11/06* (2006.01)
*B65D 33/16* (2006.01)
*B63C 9/23* (2006.01)

(52) U.S. Cl.
CPC .......... *B64D 11/0631* (2014.12); *B65D 33/16* (2013.01); *B63C 9/23* (2013.01); *Y02T 50/46* (2013.01)

(58) Field of Classification Search
CPC ............ B64D 11/0631; B64D 11/0629; B64D 11/0627; B65D 33/16; B63C 9/23
USPC .............................................. 383/42, 33, 80
See application file for complete search history.

(56) References Cited

U.S. PATENT DOCUMENTS

| | | | |
|---|---|---|---|
| 4,526,291 A * | 7/1985 | Margulies | B65D 83/0805 206/409 |
| 7,077,466 B2 | 7/2006 | Förstner et al. | |
| 7,252,569 B2 | 8/2007 | Everhart | |
| 7,988,008 B2 * | 8/2011 | Banik | B65D 83/0805 220/254.3 |
| 9,561,859 B2 | 2/2017 | White | |
| 2005/0062319 A1 * | 3/2005 | Hough | B63C 9/22 297/188.08 |
| 2007/0015422 A1 * | 1/2007 | Everhart | B64D 11/06 441/80 |
| 2008/0106127 A1 | 5/2008 | Hough | |
| 2009/0001779 A1 * | 1/2009 | Wieland | B64D 11/06 297/188.13 |
| 2009/0242695 A1 * | 10/2009 | Lamoree | B64D 11/06 244/1 R |
| 2015/0034641 A1 * | 2/2015 | Aruga | B64D 11/0631 220/214 |
| 2017/0225790 A1 * | 8/2017 | Ball | B64D 11/0631 |

FOREIGN PATENT DOCUMENTS

WO 2008057617 A2 5/2008

* cited by examiner

*Primary Examiner* — Jes F Pascua
(74) *Attorney, Agent, or Firm* — Clements Bernard Walker

(57) ABSTRACT

A life vest stowage pouch including a rigid throat having an opening therethrough, a fabric pouch attached to a back of the rigid throat and having an opening held open by the rigid throat, and a rigid door attached to a front of the rigid throat comprising a latch adapted to engage with a catch on the rigid throat to hold the rigid door closed, wherein the interior volume of the fabric pouch is sized to accommodate therein an inflatable life vest in a deflated state.

10 Claims, 7 Drawing Sheets

AIRCRAFT LIFE VEST STOWAGE POUCH

CROSS-REFERENCE TO RELATED APPLICATION

This application claims priority from U.S. Provisional Application No. 62/452,421 filed Jan. 31, 2017, the entirety of which is incorporated by referenced herein.

BACKGROUND

The present invention relates generally to the field of stowing articles aboard aircraft, and more particularly, to a life vest stowage pouch having a rigid door and soft pouch for efficient packaging, low cost and reduced weight ideal for use aboard airliners.

Aircraft commonly travel over bodies of water such as lakes, rivers and oceans. As such, it is necessary for aircraft to have life savings devices on board such as life vests, inside the aircraft cabin, in the event of an emergency. Further, because such life saving devices must be readily accessible to all passengers, such devices must be located where passengers are most likely to be located. Typically, life vests are located adjacent or under a seat bottom. Unfortunately, in this location, life vests are subject to dust and debris collection, and more importantly, passenger tampering that can prevent successful deployment in the event of an emergency. Thus, there exists a need for a stowage solution capable of protecting a life vest from wear and tear and tampering, while remaining readily accessible to passengers.

Conflicting with the necessity of security and accessibility are the economies of volume and weight associated with aircraft. Because the allowable weight of fixtures and cargo on an aircraft are limited, it is necessary to reduce the weight requisite fixtures to allow for additional discretionary cargo. Similarly, because volume and space in an aircraft is limited, it is important to reduce volume of space occupied by fixtures to allow for additional discretionary cargo. Thus, there also exists a need for a life vest stowage solution that minimizes volume and space.

BRIEF SUMMARY

To achieve the foregoing and other aspects and advantages, in one embodiment the inventive concepts disclosed herein are directed to a life vest stowage pouch including a rigid throat having an opening therethrough, a fabric pouch attached to a back of the rigid throat and including an opening held open by the rigid throat, and a rigid door attached to a front of the rigid throat, the rigid door including a latch adapted to engage with a catch on the rigid throat to hold the rigid door closed, wherein the interior volume of the fabric pouch is sized to accommodate therein an inflatable life vest in a deflated state.

In another aspect, the stowage pouch may include a tamper evidence feature including a first feature disposed on the rigid throat, a second feature disposed on the rigid door, and a seal received through the first and second features, wherein the seal is unbroken when the rigid door is closed and the first and second features are together, and the seal is broken when rigid door is open and the first and second features are spaced apart.

In another aspect, the first feature may be a ring, the second feature may be a ring, and the seal may be broken by a force of at least 0.5 kg.

In another aspect, the rigid door may be hinged along a bottom edge to the rigid throat, and the latch may be disposed along a top edge of the rigid door.

In another aspect, at least one of the rigid throat and the rigid door may be transparent or translucent.

In another aspect, the stowage pouch may include a fastener adapted to attach the life vest stowage pouch under a seat bottom.

In another aspect, the fabric pouch may be secured at the opening thereof to a rigid collar that snap-fit engages with the back of the rigid throat such that no gap is provided between the rigid collar and the rigid throat.

In another aspect, the stowage pouch may include a strap disposed outside of the life vest stowage pouch at a front of the life vest stowage pouch, the strap fed through an opening between the rigid door and the rigid throat and adapted to attach to a life vest stowed in the interior volume of the fabric pouch, the strap adapted to be pulled to open the rigid door and retrieve the life vest.

In another aspect, the latch may include a guide for guiding the strap out through the front of the life vest stowage pouch.

In another embodiment, the inventive concepts disclosed herein are directed to an aircraft life vest stowage pouch including a rigid throat having an opening therethrough, a fabric pouch attached to a back of the rigid throat and including an opening held open by the rigid throat, a rigid door attached to a front of the rigid throat and including a latch adapted to engage with a catch on the rigid throat to hold the rigid door closed, a life vest disposed in the fabric pouch, and a strap having a free end and an attached end, the attached end attached to the life vest and the free end disposed through the front of the aircraft life vest stowage pouch, the strap routed between the latch and the catch such that pulling force on the strap releases the latch from the catch thereby opening the rigid door.

In another aspect, the stowage pouch may include a tamper evidence feature including a first feature disposed on the rigid throat, a second feature disposed on the rigid door, and a seal received through the first and second features, wherein the seal is unbroken when the rigid door is closed and the first and second features are together, and the seal is broken when rigid door is open and the first and second features are spaced apart.

DESCRIPTION OF THE DRAWINGS

Features, aspects and advantages of the present invention are understood when the following detailed description of the invention is read with reference to the accompanying drawings, in which.

DETAILED DESCRIPTION

The inventive concepts disclosed herein are generally directed to a life vest stowage pouch for use aboard aircraft and other conveyances. The life vest stowage pouch is particularly suited for use aboard aircraft in that the stowage pouch is lightweight, low-cost, and particularly suited for under seat location. The stowage pouch is configured to hold a single inflatable life vest in a deflated state, is configured with a tamper evidence feature, is configured for ease of search, and maximizes under seat stowage for personal articles, among other features and advantages.

Figure 1:
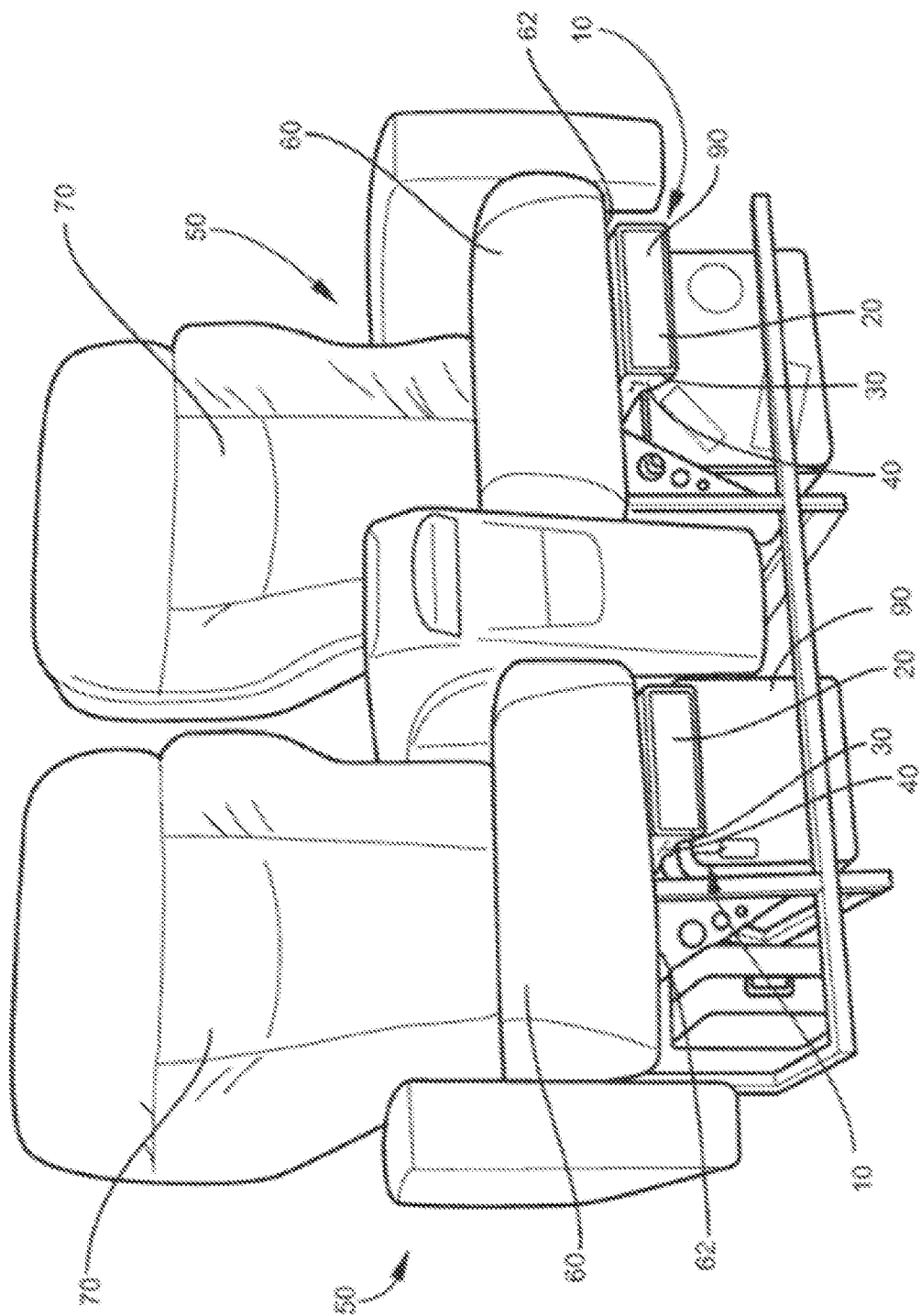
FIG. 1 is a perspective view of exemplary passenger seats each equipped with a life vest stowage pouch.

Referring to FIG. 1, an exemplary passenger seating arrangement includes first and second laterally-adjacent passenger seats 50. Each passenger seat 50 generally includes a seat bottom 60 and a seat back 70. Disposed beneath or below each seat bottom 60 is a life vest stowage pouch 10. While the life vest stowage pouches 10 are shown disposed below the seat bottoms 60, slightly back of the forward edge thereof, other mounting locations are envisioned within the aircraft readily accessible by passengers in the event of an emergency.

Each passenger seat 50 is equipped with a dedicated life vest stowage pouch 10 containing at least one life vest, for example, an inflatable life vest in a deflated state. The stowage pouch 10 opens to the front of the seat such that the passenger, in the event of an emergency, can reach down, grab a strap presented at the front the pouch, and pull the strap to open the pouch to retrieve the life vest. The stowage pouch 10 is mounted below the seat bottom 60, for example, directly up against the underside 62 of the seat bottom 60 to maximize storage space below the seat. Thus, the stowage pouch 10 is efficiently packaged to maximize under-seat stowage space.

The stowage pouch 10 generally includes a rigid front end and a soft back end. More specifically, the stowage pouch 10 includes a rigid door 20 and a rigid throat 30 at the front, and a fabric pouch 40 at the back. Such a configuration advantageously provides durability and protection at the front, and a reduced profile at the rear, among other advantages. Further, the rigid front end provides a rigid opening for ease of withdrawal of the life vest through the front end. Rigid materials suitable for the throat 30 and door 20 include, but are not limited to, plastics and like materials. Fabrics suitable for the fabric pouch 40 include, but are not limited to, flame-resistant fabrics suitable for use aboard aircraft.

Figure 2:
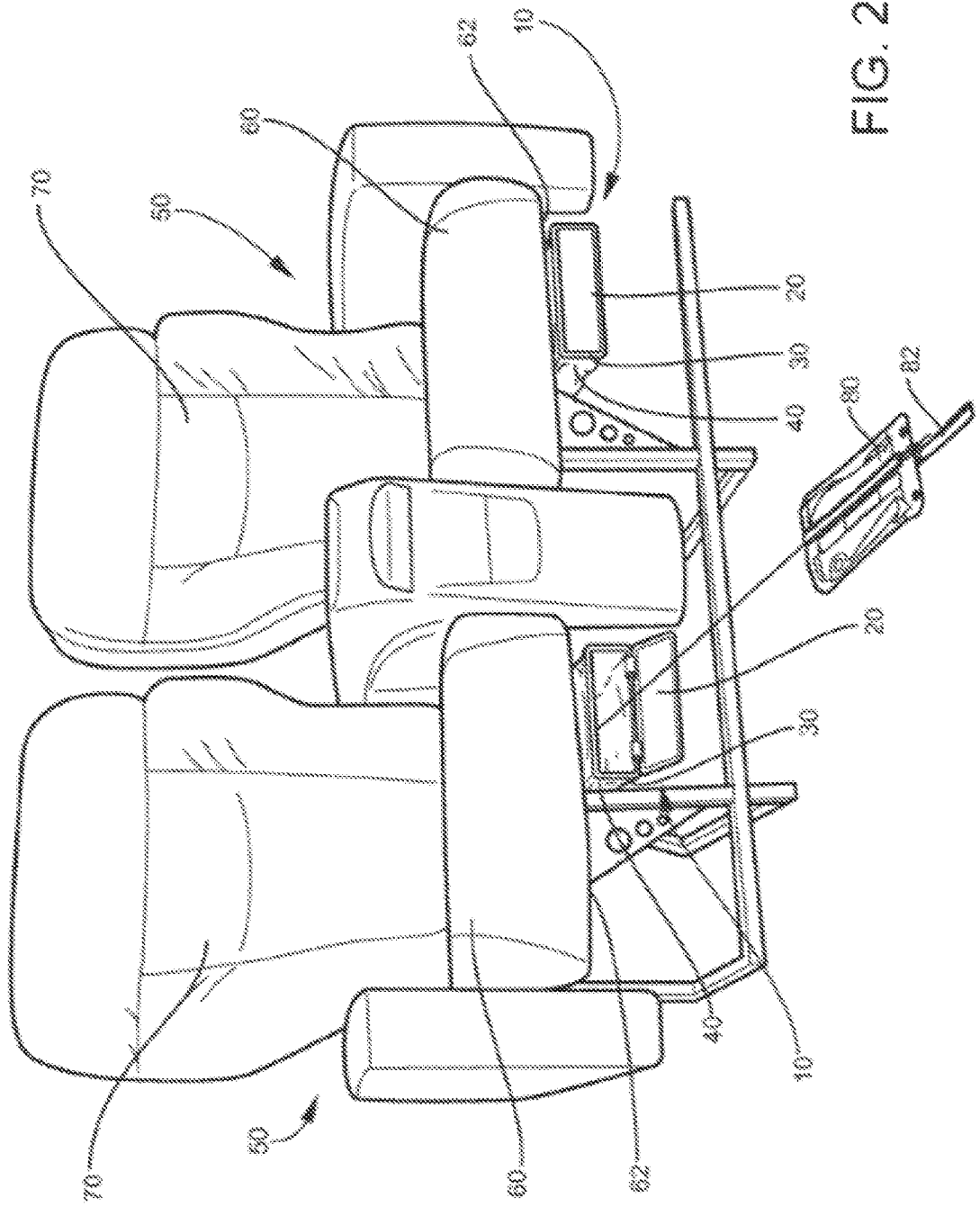
FIG. 2 shows one of the stowage pouches open and with the respective life vest removed.

Referring to FIG. 2, the rigid door 20 pivots down and out of the way of the opening to avoid obstruction. The rigid door 20 may be hinged along the bottom edge thereof to the front of the rigid throat 30. At least one of the rigid throat 30 and the rigid door 20 may be translucent or transparent to permit visual inspection and facilitate ease of searching for contents, contraband, tampering, etc. The life vest 80 is retrieved through the front of the stowage pouch 10 by pulling a strap 82 attached to the life vest, as described in detail below.

Figure 3:
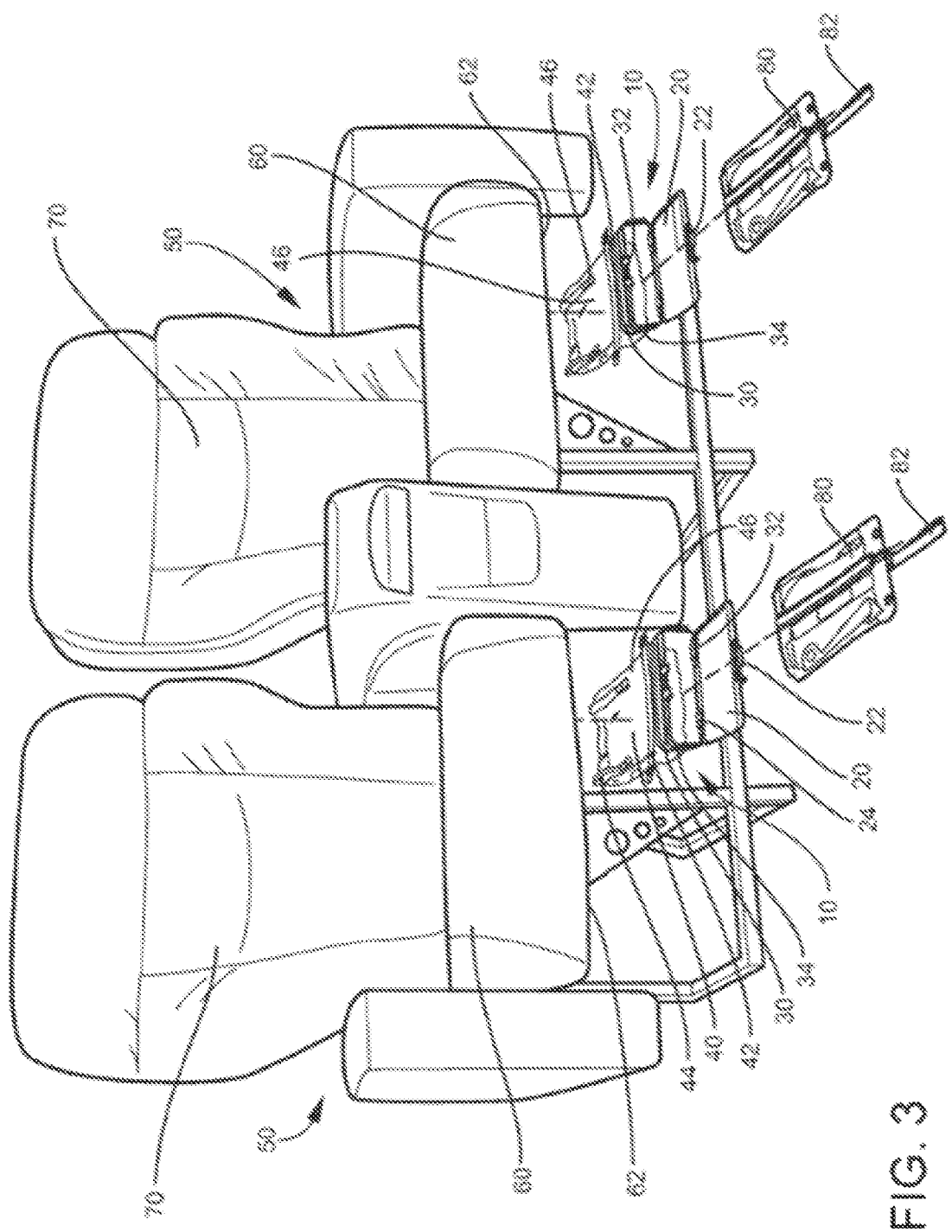
FIG. 3 shows both pouches detached and open and with the respective life vests removed.
Figure 4:
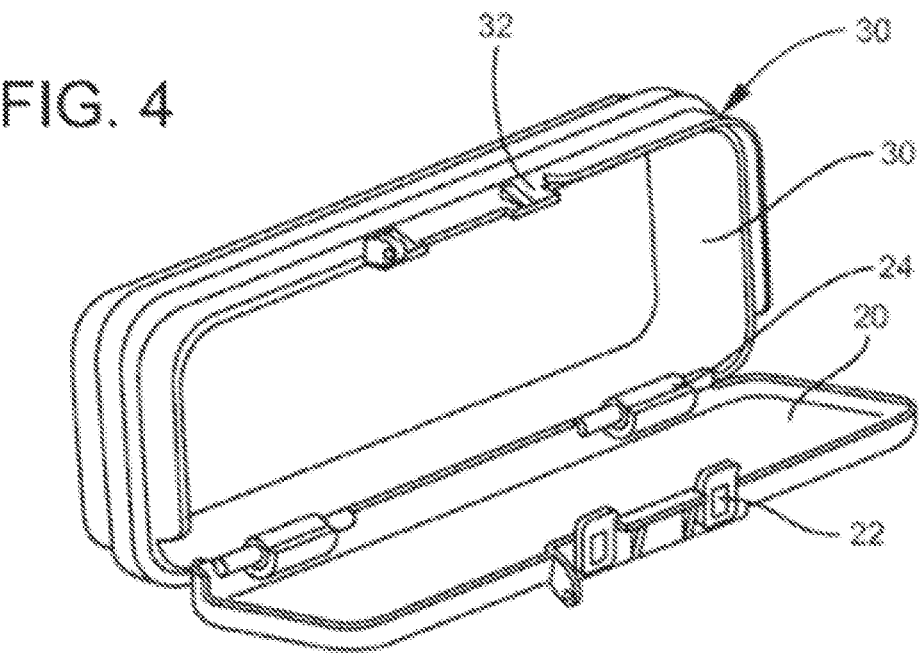
FIG. 4 is a perspective view of the rigid door of the pouch.
Figure 5:
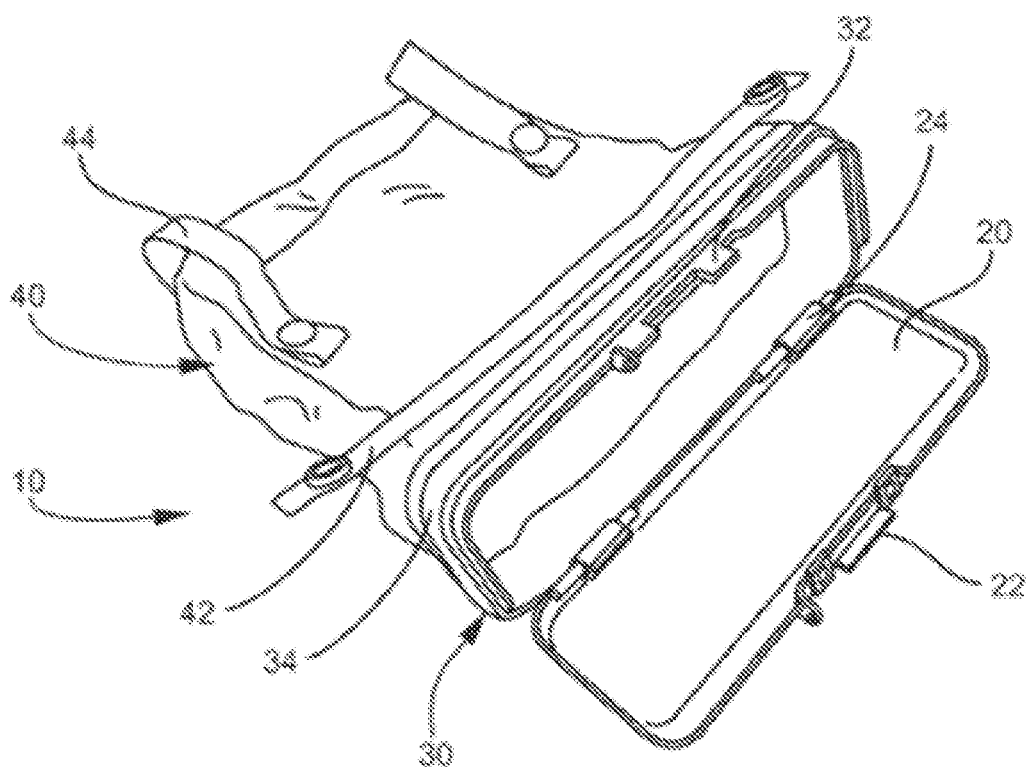
FIG. 5 is a perspective view of the complete pouch assembly.

Referring to FIGS. 3-5, each stowage pouch 10 may be equipped with or otherwise held in place using at least one fastener. For example, as shown the at least one fastener includes a front fastener 42 disposed proximate a forward end of the stowage pouch 10, and at least one rear fastener 44 disposed proximate a rear end of the stowage pouch 10. For example, the front fastener 42 may be single fastener and the rear fastener may include two separate fasteners 44, 46 oriented perpendicular to the front fastener 42. The fasteners may be straps, elastic bands or other means for releasably securing the stowage pouch 10 in place, for example, about the underside of the seat bottom. The fasteners may secure around beam tubes of the seat of attach directly to the underside of the seat bottom, for example, using hook-and-loop fasteners.

Referring to FIG. 4, the front door 20 is hinged along the bottom edge thereof to the rigid throat 30. Two spaced hinges 24 may serve to attach the rigid door 20 such that the door is able to pivot open and closed. A latch 22 is provided along the "top" edge of the door 20 and is adapted to engage a latch 32 disposed on the front the rigid throat 30 to hold the door 20 closed. As shown, the latch 22 may include spaced features that slide over ramped hooks of the catch 32. The latch 22 can be released from the catch 32 when a threshold pulling force is exceeded, for example, in excess of 0.5 kg of force when the handle is pulled. The latch features can also be raised to clear the underlying catches. The rigid throat 30 defines a front end and back end and an elongate opening therethrough. The opening is closed when the door 20 is closed, and is unobstructed when the door 20 is fully open.

Referring to FIG. 5, the fabric pouch 40 is attached to the back of the rigid throat 30, and multiple straps 42, 44 can be used to secure the stowage pouch 10 in place is the desired mounting location.

Figure 6:
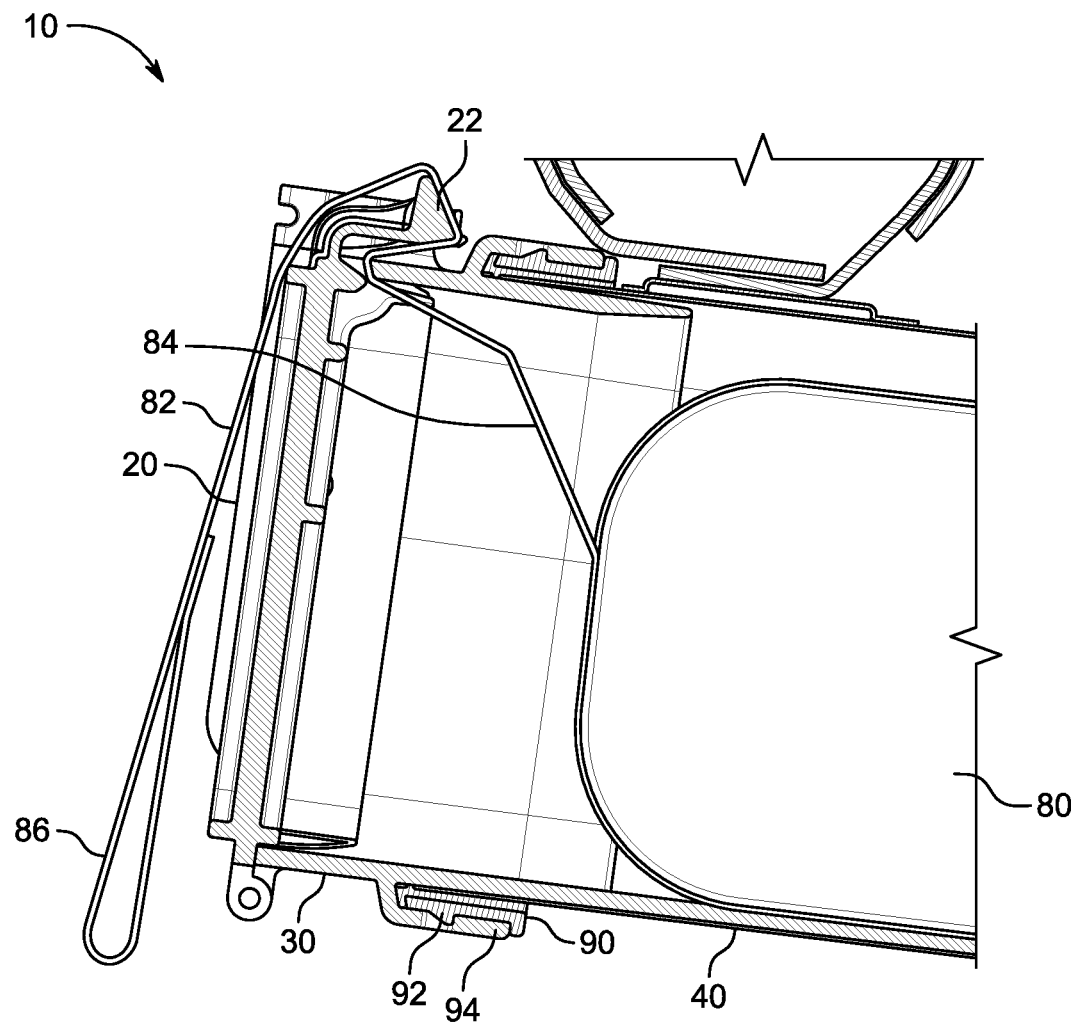
FIG. 6 is a partial cross-section showing strap routing through the door.

Referring to FIG. 6, the strap 82 includes an attached end 84 and a free end 86. The attached end 84 is secured to the life vest 80 such that the life vest 80 is pulled from the interior volume of the stowage pouch by pulling on the free end 86 of the strap 82. The strap 82 is routed through the stowage pouch 10 such that the strap 82 passes in space between the rigid throat 30 and the rigid door 20 such that a predetermined force on the strap 82 releases the latch and pulls the rigid door 20 open. For example, the strap 82 may be guided out of the front of the stowage pouch 10 by passing over the latch 22, such that the latch 22 is provided with a guide for guiding the strap 82 and generally centering the strap forward of the stowage pouch. In this configuration, about 20-25 cm of strap length is available for being grabbed, for example, with one or more fingers.

The fabric pouch 40 may be sewn or otherwise attached to a rigid collar 90 that snap-fit engages with the rigid throat 30. This ensures a tight fit between the fabric pouch 40 and the rigid throat 30 such that items cannot pass therebetween, for example, contraband attempted to be introduced into the interior volume of the stowage pouch 40. The rigid collar 90 may include retention features 92 that are forced past portions of a receiver portion 94 defined along the outside of the rigid throat 30, and come to rest in openings, thereby preventing the collar, along with the attached fabric pouch 40, from being pulled apart from the rigid throat 30. In one embodiment, the rigid collar 90 is a ring.

Figure 7:
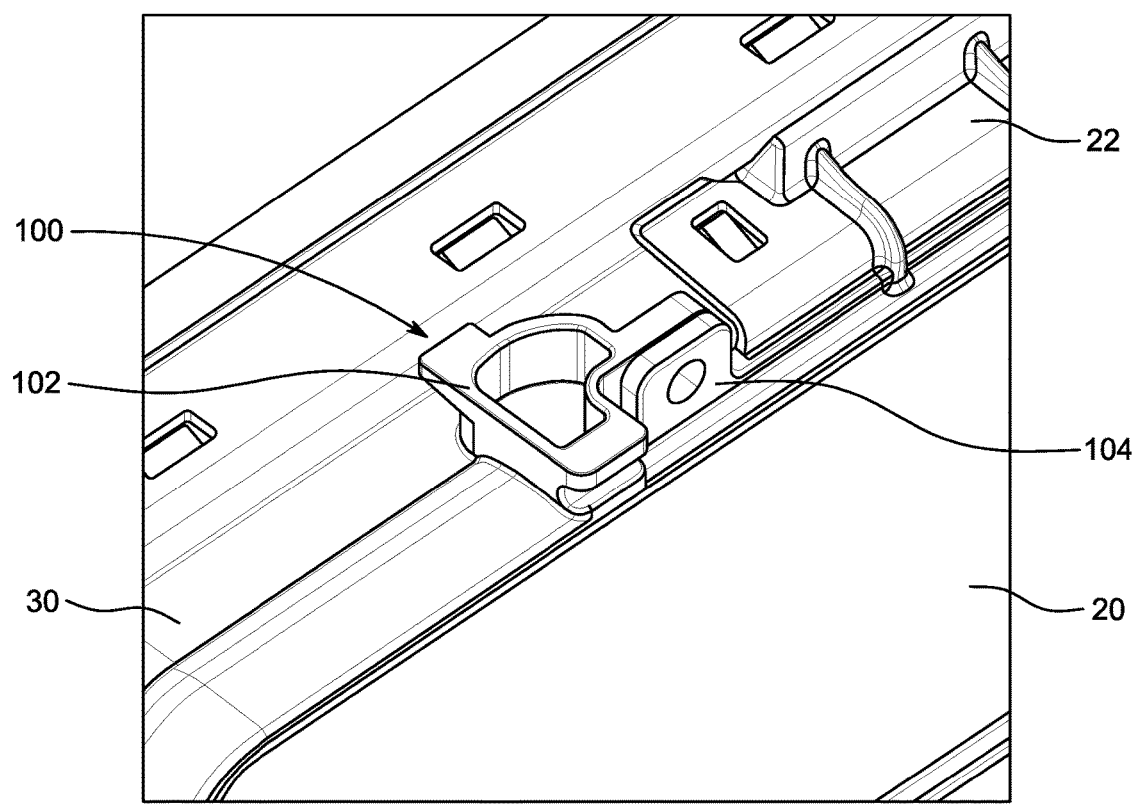
FIG. 7 is detailed view of a lock feature of the door.
Figure 8:
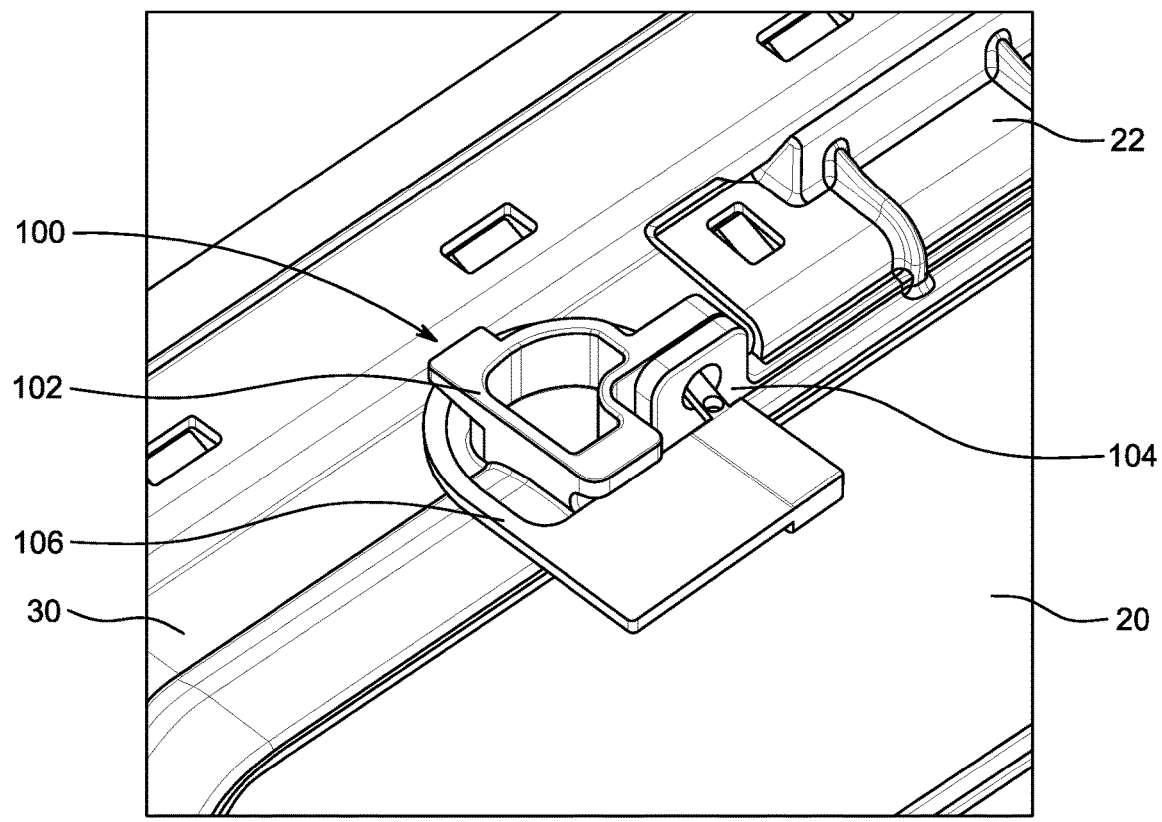
FIG. 8 shows a lock installed on the door.

Referring to FIGS. 7 and 8, the stowage pouch may further include a tamper evidence feature 100 generally including a first feature 102 disposed on the rigid throat 30, a second feature 104 disposed on the rigid door, and a seal 106 received through the first and second features 102, 104. The seal 106 is unbroken when the rigid door 20 is closed and the first and second features 102, 104 are together, and the seal 106 is broken when rigid door 20 is open and the first and second features 102, 104 are spaced apart. The seal 106 is intact or unbroken to indicate that the rigid door 20 has not been opened enough to break the seal, and breaks when the rigid door 20 is open an amount sufficient to break the seal. In a particular embodiment, the first and second features 102, 104 are each rings that align when the rigid door 20 is closed such that the seal 106, which can be a lock-like structure, can pass through the aligned features. The lock, which can otherwise be a tie, strap, sticker, etc. is configured to break under a pre-determined amount of force, force example, at least 0.5 kgs, such that the lock strength does not impede with pulling the handle to retrieve the life vest.

The stowage pouch can further be configured with one or more of a bias member to bias the rigid door toward closed, door structure for locating the pull strap, stiffening beads or ribs for reinforcement, a throat threshold providing a smooth transition between the throat opening and fabric pouch, etc. The fabric pouch may include internal plastic reinforcements to enhance rigidity, resist sagging and assist upward retention of the pouch.

What is claimed is:

1. A life vest stowage pouch, comprising:
   a rigid throat having an opening therethrough;
   a fabric pouch attached to a back of the rigid throat and comprising an opening held open by the rigid throat;
   a rigid door attached to a front of the rigid throat, the rigid door comprising a latch adapted to engage with a catch on the rigid throat to hold the rigid door closed;
   a strap having one end disposed outside of a front end of the life vest stowage pouch and an opposing end attachable to a life vest, the strap fed through an opening positioned between the rigid door and the rigid throat, the strap adapted to be pulled to open the rigid door to retrieve the life vest; and
   a tamper evidence feature including a first ring disposed on the rigid throat, a second ring disposed on the rigid door, and a seal received through the first and second rings, wherein the seal is unbroken when the rigid door is closed and the seal is broken when the rigid door is opened, and wherein the seal is broken by applying a pulling force of at least 0.5 kg on the rigid door to move the first and second rings apart;
   wherein the interior volume of the fabric pouch is sized to accommodate therein an inflatable life vest in a deflated state.

2. The life vest stowage pouch of claim 1, wherein the rigid door is hinged along a bottom edge to the rigid throat, and the latch is disposed along a top edge of the rigid door.

3. The life vest stowage pouch of claim 1, wherein at least one of the rigid throat and the rigid door is transparent or translucent.

4. The life vest stowage pouch of claim 1, further comprising a fastener adapted to attach the life vest stowage pouch under a seat bottom.

5. The life vest stowage pouch of claim 1, wherein the fabric pouch is secured at the opening thereof to a rigid collar that snap-fit engages with the back of the rigid throat such that no gap is provided between the rigid collar and the rigid throat.

6. The life vest stowage pouch of claim 1, wherein the latch comprises a guide for guiding the strap out of the front of the life vest stowage pouch.

7. An aircraft life vest stowage pouch, comprising:
   a rigid throat having an opening therethrough;
   a fabric pouch attached to a back of the rigid throat and comprising an opening held open by the rigid throat;
   a rigid door attached to a front of the rigid throat, the rigid door comprising a latch adapted to engage with a catch on the rigid throat to hold the rigid door closed;
   a life vest disposed in the fabric pouch; and
   a strap having a free end and an attached end, the attached end attached to the life vest and the free end disposed through the front of the aircraft life vest stowage pouch, the strap routed between the latch and the catch such that pulling force on the strap releases the latch from the catch thereby opening the rigid door; and
   a tamper evidence feature including a first ring disposed on the rigid throat, a second ring disposed on the rigid door, and a seal received through the first and second rings, wherein the seal is unbroken when the rigid door is closed and the seal is broken when the rigid door is opened, and wherein the seal is broken by applying a pulling force of at least 0.5 kg on the rigid door to move the first and second rings apart.

8. The life vest stowage pouch of claim 7, wherein the rigid door is hinged along a bottom edge to the rigid throat, and the latch is disposed along a top edge of the rigid door, and wherein at least one of the rigid throat and the rigid door is transparent or translucent.

9. The life vest stowage pouch of claim 7, further comprising a fastener adapted to attach the life vest stowage pouch under a seat bottom.

10. The life vest stowage pouch of claim 7, wherein the fabric pouch is secured at the opening thereof to a rigid collar that snap-fit engages with the back of the rigid throat such that no gap is provided between the rigid collar and the rigid throat.

* * * * *